United States Patent Office 3,356,686
Patented Dec. 5, 1967

3,356,686
SUBSTITUTED AMIDOPYRAZALONES CONTAINING A TERMINAL ETHYLENICALLY UNSATURATED GROUP
John Charles Firestine, South River, and Jacob Quentin Umberger, Holmdel, N.J., assignors to E. I. du Pont de Nemours and Company, Wilmington, Del., a corporation of Delaware
No Drawing. Filed Apr. 10, 1964, Ser. No. 358,920
4 Claims. (Cl. 260—310)

The present application is a continuation-in-part of applicant's prior application Ser. No. 21,959 filed Apr. 13, 1960 (U.S. Patent 3,163,625, Dec. 29, 1964).

This invention relates to a new class of addition polymerizable color-forming monomers.

Various monomeric and polymeric color formers embodying a pyrazolone nucleus or nuclei are known. In many of the monomeric color formers, the pyrazolone nucleus is linked through an acyclic amide group to an aliphatic hydrocarbon radical of high molecular weight. The previous polymeric color formers having an amide linkage, in general, are amides of pre-formed polymeric acids and the amido nitrogen atom is not attached directly to the pyrazolone ring. Since the basic polymer structure has already been established in such color formers, it is not possible to readily vary the physical properties of the resulting polymers or to obtain the desired high degree of substitution with coupler groups.

An object of this invention is to provide a new class of color-forming compounds containing a pyrazolone nucleus. Another object is to provide new addition polymerizable monomers having a pyrazolone nucleus linked through an acyclic amide linkage in the 3-position of the pyrazolone. A further object is to provide such monomers that are useful in making new non-diffusing copolymer color formers. Still further objects will be apparent from the following description of the invention.

The addition polymerizable monomers of this invention are substituted 3-amidopyrazolones of the formula (a) 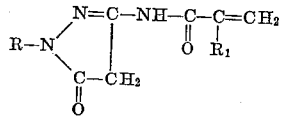

wherein R is a monovalent cyclic nucleus taken from the group consisting of benzene, naphthalene, pyridine, quinoline and 2-benzochalcazolyl nuclei directly connected to the intracyclic nitrogen atom by an intracyclic carbon atom and $R_1$ is hydrogen, alkyl of 1–4 carbons or chlorine. The radical can be unsubstituted or substituted with chlorine, bromine, nitro, cyano, alkoxy or alkyl groups. Suitable values for R include phenyl, m-tolyl, p-methoxyphenyl, p-chlorophenyl, p-bromophenyl, trichlorophenyl, p-cyanophenyl, p-nitrophenyl, and naphthyl; 2-benzoxazolyl, 2-benzothiazolyl, 2-, 3- and 4-pyridyl and 2-quinolyl.

The compounds of Formula (a), as disclosed in prior application Ser. No. 21,959 (U.S. Patent 3,163,625) can be copolymerized with (b) a normallly non-gaseous, ethylenically unsaturated monomer containing at least one terminal ethylenic group ($CH_2\!\!=\!\!C\!<$) and a water-solubilizing radical selected from the group consisting of acids and salts of acids of $pK_a$ less than 11, and being capable of forming a high polymer in the presence of an addition polymerization initiator; and/or (c) a normally non-gaseous ethylenically unsaturated monomer containing at least one terminal ethylenic group, said monomer being non-ionizable, i.e., free from water-solubilizing acid, acid salt and basic amino groups, and capable of forming a high polymer in the presence of an addition polymerization initiator.

Suitable ionizable monomers for component (b) include acrylic acid, alpha-alkacrylic acids where alk is an alkyl radical of 1–4 carbons, e.g., methyl, ethyl, propyl and butyl; alpha-chloracrylic acid, sturene sulfonic acid and its alkali metal, ammonium and amine salts, sodium vinyl sulfonate, 2- and 4-vinylpyridine and its salts (e.g., hydrochloric or sulfuric acid salts) or quaternary alkyl or aralkyl salts; and quaternary salts of diethylaminoethyl acrylate or methacrylate.

Suitable non-ionizable monomers for component (c) include styrene; esters of monohydric alcohols of 1–8 carbons, e.g., methanol, ethanol, n-propanol, n-butanol and 2-n-hexanol with the above listed acrylic, alkacrylic and alpha-chloracrylic acids; acrylamide, ethacrylamide; acrylonitrile, methacrylonitrile; vinyl ethyl ether and ureidoethyl vinyl ether; methyl vinyl ketone and N-vinyl-2-pyrrolidone.

The monomers of types (b) and (c) are liquids or solids at normal temperature and pressure, and, in general, have a boiling point above about 30° C., and a molecular weight less than 1500 and each are used in amounts of 5–45 parts by weight together with 90–10 parts by weight of component (a).

In general, the copolymer color formers made from the monomers of this invention contain 90 to 10 parts of (a) and 5 to 45 parts of (b) and/or 5 to 45 parts of (c), said parts being by weight.

Useful copolymers of said prior application consist of intralinear units of the formulae:

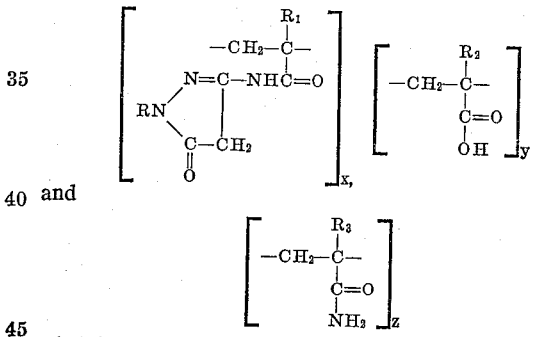

wherein R and $R_1$ have the same values as in the first structural formula given above, $R_2$ and $R_3$ are each a member selected from the group consisting of hydrogen, alkyl of 1–4 carbons, and chlorine, and x, y and z constitute the number of the respective units in the polymer. In general, the copolymers have molecular weights in excess of 2500 up to 100,000 and more. In dicomponent copolymers, unit y or z may be present.

In both the formula for the monomer and the above formula, the pyrazolone unit is shown in one of its tautomeric forms.

The copolymers of the prior application can be made by copolymerizing a mixture of two or three components, for example (1) the 1-substituted-3-acrylamido or alpha-alkacrylamido-5-pyrazolone monomer, (2) acrylic acid and (3) acrylamide in a suitable solvent medium and in the presence of an addition polymerization initiator preferably one which is active thermally below 100° C. However, initiators activatable by actinic light can be used. Suitable initiators are given in U.S. Patent 2,830,972 and in the examples of this application.

The copolymers made from the monomers of this invention are useful as magenta color formers since they form magenta azomethine dyes when latent silver halide images are developed in their presence by means of alkaline developer solutions containing a primary aromatic amine color-developing agent. Suitable such agents are described in U.S. Patent 2,481,476. The magenta dye images have excellent color, definition and stability. The copolymers can be admixed with water-permeable organic colloids of high molecular weight having protective colloid properties both of natural and synthetic type which are binding agents for silver halide grains. They are useful in thin silver halide emulsion layers of multilayer color films and do not migrate or diffuse when such films are treated in aqueous developing, fixing, bleaching or washing baths. They are especially useful in gelatino-silver halide emulsions and emulsion layers.

Since the unsaturated monomers of Formula (a) are new compounds, the following representative procedures for preparing the same and examples of the invention are given below. Suitable 1-substituted-3-amino-5-pyrazolones having the 1-substituent listed above are disclosed in J. Am. Chem. Soc., vol. 66, pp. 1851–55 (1944). Each of these amino compounds can be reacted with acrylyl chloride or methacrylyl chloride, or other unsaturated acid chloride, to form the corresponding unsaturated amides by the processes set forth in the following examples. The amides can be copolymerized as taught above.

The following examples further illustrate the invention but the invention is not limited to these specific examples:

EXAMPLE I

*1-phenyl-3-methacrylamido-5-pyrazolone monomer*

Into a 3-liter, 3-necked round-bottom flask fitted with a stirrer, thermometer and condenser there were added:

175 g. (1 mole) 1-phenyl-3-amino-5-pyrazolone
1000 ml. dry pyridine

The mixture was stirred and 156 g. (1.5 moles) methacrylyl chloride added dropwise not allowing the temperature to rise above 40° C. After the addition was complete the mixture was warmed to 70° C. About 800 ml. of the pyridine was distilled off in the vacuum. The residue was diluted with 4 liters of ice water and a gummy solid separated which soon solidified. After standing overnight, the product was filtered on a Buchner filter and washed with water and sucked dry as possible. This was followed by recrystallization from 400 ml. of ethanol, filtration on a suction filter, washing with ethanol and washing with ether. The product, 1-phenyl-3-methacrylamido-5-pyrazolone, was in the form of sparkling pale yellow crystals weighing 100 g. (41% of theoretical), M.P. 170–172° C.

Similar results and corresponding amides can be obtained by substituting acrylyl chloride or alpha-chloracrylyl bromide in equivalent amount for the methacrylyl chloride.

EXAMPLE II

*1-(p-bromophenyl)-3-methacrylamido-5-pyrazolone monomer*

To a 2-liter round-bottomed flask fitted with a stirrer was added:

326 ml. sodium ethylate, 18% by weight
36.9 g. ethyl cyanoacetate
73 g. p-bromophenylhydrazine The mixture, after heating at reflux for 16 hours, was still basic. The alcohol was removed under vacuum and the solution diluted with water and filtered. After acidification with glacial acetic acid, a solid was separated by filtration, washed with water, and then recrystallized from ethanol. The yield was 12 g. of p-bromophenyl-3-amino-5-pyrazolone, M.P. 152–161° C. (not completely purified).

The 12 g. (0.05 mole) of the amino-pyrazolone were dissolved in 100 ml. dry pyridine. The mixture was stirred and cooled to 20° C. and 10.5 g. (0.1 mole) methacrylyl chloride was added dropwise. After the addition was complete, the mixture was warmed to 60° C. and then poured onto cracked ice. A tacky material separated from which water was decanted. With recrystallization from ethanol there was a yield of 2.1 g. of a white solid, M.P. 228–230° C., 1-(p-bromophenyl)-3-methacrylamido-5-pyrazolone. This pyrazolone monomer coupled with the oxidized developing agent, p-aminodiethylaniline, to give a magenta dye.

Similar results and corresponding amides can be made by substituting an alkacrylyl chloride wherein alk is 2–4 carbons or acrylyl chloride or alpha-chloracrylyl chloride in equivalent amounts for the methacrylyl chloride.

EXAMPLE III

Using essentially the procedure disclosed in J. Am. Chem. Soc., vol. 66, pp. 1851–55 (1944), 1-(2′,4′,6′-trichlorophenyl)-3-amino-5-pyrazolone was prepared by condensing commercially available 2,4,6-trichlorophenyl hydrazine with ethyl malonate monoimidoester.

Thirteen and nine-tenths grams (0.05 mole) of this pyrazolone was mixed with 200 ml. dry pyridine. The mixture was stirred and cooled to 20° C. and 25.2 g. (0.2 mole) beta-chloropropionyl chloride was added dropwise. After the addition was complete, the mixture was warmed to 80° C. and then poured onto cracked ice. A gummy material separated from which the water was decanted. The gummy material was dissolved and dehydrohalogenated in 5% by weight aqueous sodium hydroxide by heating. Cautious addition of 3-molar HCl yielded a tan colored precipitate, 1-(2′,4′,6′-trichlorophenyl)-3-acrylamido-5-pyrazolone which coupled with p-aminodiethylaniline in the presence of $Na_2CO_3$ and $K_3Fe(CN)_6$ to form a magenta dye slightly deeper in shade than the unsubstituted pyrazolone.

The procedure in Example III which employs the commercially available beta-chloropropionyl chloride to react with, e.g., a substituted phenyl-3-aminopyrazolone to form the amide, has the advantage that it prevents side reactions and eliminates tedious purifiication procedures. Removal of HCl by treatment with aqueous base produces the desired polymerizable double bind by the well-known dehydrohalogenation treatment. This alkali treatment also has been found useful in purifying the product, e.g., by hydrolyzing any undesired ester formed by reaction of the excess acid chloride reactant with the enol form of the 5-pyrazolone group.

By substituting the other 1-substituted 3-amino-5-pyrazolones described in the journal referred to above for those in Examples I, II and III, other unsaturated amides coming under general Formula (a) can be prepared.

In prior application Ser. No. 21,959 filed Apr. 13, 1960 (U.S. Patent 3,163,625), there are disclosed some sixteen examples of the preparation and use of copolymers from the substituted 3-amidopyrazolones of this invention.

The color-forming monomers of this invention and the copolymers of the parent application Ser. No. 21,959 (U.S. Patent 3,163,625) are capable of coupling, during photographic development, to form magenta dye images of excellent spectral characteristics. The dye images, prepared from the preferred copolymers, are superior in their resistance to migration which brings about advantages in color quality and in image sharpness. These dye images have remarkable resistance to fading. A particular advantage of the color-forming copolymers is associated with their low equivalent weight which makes possible the manufacture of photographic elements having very thin coatings of emulsion layers, hence very high image definition. These copolymers contribute to the desired thinness of the film not only because of their low equivalent weights, but also because they can act to replace part of the binder since they possess protective colloid properties. A further advantage resides in the case of synthesis of these compounds. The dual use of the 3-amino group, both for attachment to the polymer and for improved spectral properties, contributes to this ease of synthesis and also contributes to the low equivalent weights which are possible with these novel color-formers. A still further advantage is found in the control that can be achieved over the composition of the copolymers, e.g., the ratio of color-forming to non-color-forming groups, as compared with lack of such control when color-formers are attached to preformed polymers. In contrast with the surfactant type of color-formers, which are hydrophobic at one end and hydrophilic at the other, the copolymers made from color formers of this invention have the advantage that they do not desorb sensitizing groups from the silver halide grain surfaces, and they do not interfere with the gelation process during coating in emulsions with low gelatin content. In contrast to photographic elements wherein color formers are dissolved in oil droplets, the color formers have the advantage that they do not add excessively to the thickness of the emulsion. It is understood that both hydrophilic and lipophilic color-coupling polymers may be made from the monomers of this invention. These may be binary, ternary, etc., copolymers in which one or more of the comonomers is of the color-coupling type herein disclosed.

We claim:
1. A substituted amidopyrazolone of the formula

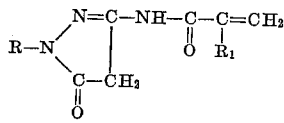

wherein R is a monovalent cyclic nucleus selected from the group consisting of benzene, naphthalene, pyridine, 2-quinolyl and 2-benzochalcazolyl and $R_1$ is a member selected from the group consisting of hydrogen, alkyl of 1–4 carbon atoms and chlorine.

2. 1-phenyl-3-methacrylamido-5-pyrazolone.
3. 1-(p-bromophenyl)-3-methacrylamido-5-pyrazolone.
4. 1 - (2′,4′,6′-trichlorophenyl)-3-acrylamido-5-pyrazolone.

References Cited

UNITED STATES PATENTS

| 2,369,489 | 2/1945 | Porter et al. | 260—310 |
| 2,600,788 | 6/1952 | Loria et al. | 260—310 |
| 2,850,485 | 9/1958 | D'Alelio | 260—80.5 |
| 2,976,294 | 3/1961 | Firestine | 260—310 |
| 3,070,442 | 12/1962 | Cohen et al. | 260—310 |

FOREIGN PATENTS

| 599,919 | 3/1948 | Great Britain. |

OTHER REFERENCES

Kunimine: Chem. Abst., vol. 47, column 3155 (1953).

WALTER A. MODANCE, *Primary Examiner.*

J. D. RANDOLPH, *Examiner.*

N. TROUSOF, *Assistant Examiner.*